(12) United States Patent
Mathew et al.

(10) Patent No.: US 10,572,649 B2
(45) Date of Patent: *Feb. 25, 2020

(54) SESSION ACTIVITY TRACKING FOR SESSION ADOPTION ACROSS MULTIPLE DATA CENTERS

(71) Applicant: Oracle International Corporation, Redwood Shores, CA (US)

(72) Inventors: Stephen Mathew, Bangalore (IN); Vipin Anaparakkal Koottayi, Trikarpur (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,261

(22) Filed: Sep. 18, 2017

(65) Prior Publication Data
US 2018/0046794 A1 Feb. 15, 2018

Related U.S. Application Data

(63) Continuation of application No. 14/754,222, filed on Jun. 29, 2015, now Pat. No. 9,769,147.

(51) Int. Cl.
*G06F 7/04* (2006.01)
*G06F 21/41* (2013.01)
(Continued)

(52) U.S. Cl.
CPC .......... *G06F 21/41* (2013.01); *H04L 63/0815* (2013.01); *H04L 65/1066* (2013.01);
(Continued)

(58) Field of Classification Search
USPC .......................................................... 726/4
See application file for complete search history.

(56) References Cited

U.S. PATENT DOCUMENTS 6,041,357 A 3/2000 Kunzelman et al.
6,055,637 A 4/2000 Hudson et al.
(Continued)

FOREIGN PATENT DOCUMENTS

EP 1864240 12/2007
WO 2013049461 4/2013
(Continued)

OTHER PUBLICATIONS

BIG-IP Access Policy Manager, http://www.f5.com/pdf/products/big-ip-access-policy-manager-ds.pdf, 13 pages, 2017.
(Continued)

*Primary Examiner* — Brandon S Hoffman
(74) *Attorney, Agent, or Firm* — Kilpatrick Townsend & Stockton LLP

(57) ABSTRACT

Techniques are disclosed for managing session activity of SSO access across multiple data centers. Session activity of SSO access is managed across multiple geographically disperse computing systems clustered together to form a multi-data center (MDC) system. A first data center in the MDC system may implement session adoption to manage an SSO session of the user in the MDC system. Information about subsequent sessions established by other data centers may be adopted by the first data center. The first data center may obtain session activity data from each session that is adopted for the user. The session activity may be used to determine whether SSO session is active for the user across data centers in the MDC system. Authorization to access a resource at any data center in the MDC system may be granted based on the status of the SSO session using session adoption among the data centers.

20 Claims, 8 Drawing Sheets

(51) Int. Cl.
*H04L 29/06* (2006.01)
*H04L 29/08* (2006.01)

(52) U.S. Cl.
CPC ........ *H04L 67/142* (2013.01); *H04L 63/0846* (2013.01); *H04L 63/10* (2013.01); *H04L 63/102* (2013.01)

(56) References Cited

U.S. PATENT DOCUMENTS

| | | | |
|---|---|---|---|
| 6,076,108 A | 6/2000 | Courts et al. | |
| 6,178,511 B1 | 1/2001 | Cohen et al. | |
| 6,338,064 B1 | 1/2002 | Ault et al. | |
| 6,385,724 B1 | 5/2002 | Beckman et al. | |
| 6,430,619 B1 | 8/2002 | Sitaraman et al. | |
| 6,811,873 B2 | 11/2004 | Nadkarni | |
| 7,100,195 B1 | 8/2006 | Underwood | |
| 7,137,006 B1 | 11/2006 | Grandcolas et al. | |
| 7,225,256 B2 | 5/2007 | Villavicencio | |
| 7,296,290 B2 | 11/2007 | Barriga et al. | |
| 7,426,642 B2 | 9/2008 | Aupperle et al. | |
| 7,437,594 B1 | 10/2008 | Mount et al. | |
| 7,496,953 B2 | 2/2009 | Andreev et al. | |
| 7,525,938 B2 | 4/2009 | Hurtta | |
| 7,747,746 B2 | 6/2010 | Thayer et al. | |
| 7,761,911 B2 | 7/2010 | Song | |
| 7,805,529 B2 | 9/2010 | Galluzzo et al. | |
| 7,805,757 B2 | 9/2010 | Menten | |
| 7,818,582 B2 | 10/2010 | Marion et al. | |
| 7,886,000 B1 | 2/2011 | Polis et al. | |
| 7,908,380 B1 | 3/2011 | Chu et al. | |
| 7,996,376 B2 | 8/2011 | Singh et al. | |
| 8,001,232 B1 | 8/2011 | Saulpaugh et al. | |
| 8,073,954 B1 | 12/2011 | Tu et al. | |
| 8,117,649 B2 | 2/2012 | Hardt | |
| 8,244,907 B2 | 8/2012 | Hinton et al. | |
| 8,365,266 B2 | 1/2013 | Bogner | |
| 8,438,635 B2 | 5/2013 | Das et al. | |
| 8,442,943 B2 | 5/2013 | Multer et al. | |
| 8,468,586 B2 | 6/2013 | Koottayi et al. | |
| 8,495,195 B1 | 7/2013 | Abidogun et al. | |
| 8,544,069 B1 | 9/2013 | Subbiah et al. | |
| 8,611,873 B2 | 12/2013 | Onyon et al. | |
| 8,627,435 B2 | 1/2014 | Sirota | |
| 8,627,479 B2 | 1/2014 | Wittenstein et al. | |
| 8,650,305 B2 | 2/2014 | Booth et al. | |
| 8,719,342 B2 | 5/2014 | Mutikainen et al. | |
| 8,738,774 B2 | 5/2014 | Sheng et al. | |
| 8,756,704 B2 | 6/2014 | Castellucci et al. | |
| 8,819,444 B2 | 8/2014 | Shahbazi et al. | |
| 8,843,997 B1 | 9/2014 | Hare | |
| 8,898,765 B2 | 11/2014 | Goyal et al. | |
| 8,955,037 B2 | 2/2015 | Srinivasan et al. | |
| 8,990,909 B2 | 3/2015 | Kelley | |
| 9,083,690 B2 | 7/2015 | Subramanya et al. | |
| 9,104,451 B2 | 8/2015 | Subramanya et al. | |
| 9,124,582 B2 | 9/2015 | Kalinichenko et al. | |
| 9,225,744 B1 | 12/2015 | Behm et al. | |
| 9,230,003 B2 | 1/2016 | Goetsch | |
| 9,240,886 B1 | 1/2016 | Allen et al. | |
| 9,247,006 B2 | 1/2016 | Mathew et al. | |
| 9,405,887 B2 | 8/2016 | Yin et al. | |
| 9,509,684 B1 | 11/2016 | Dixson-Boles et al. | |
| 9,544,293 B2 | 1/2017 | Mathew et al. | |
| 9,769,147 B2 | 9/2017 | Mathew et al. | |
| 9,866,640 B2 | 1/2018 | Motukuru et al. | |
| 9,887,981 B2 | 2/2018 | Mathew et al. | |
| 10,009,335 B2 | 6/2018 | Mathew et al. | |
| 10,084,769 B2 | 9/2018 | Mathew et al. | |
| 10,157,275 B1 | 12/2018 | Venkatasamy et al. | |
| 2002/0029269 A1 | 3/2002 | McCarty et al. | |
| 2002/0078365 A1 | 6/2002 | Burnett et al. | |
| 2003/0105862 A1 | 6/2003 | Villavicencio | |
| 2003/0212887 A1 | 11/2003 | Walther et al. | |
| 2004/0003259 A1 | 1/2004 | Chang | |
| 2004/0073666 A1 | 4/2004 | Foster et al. | |
| 2004/0260810 A1 | 12/2004 | Bernoth | |
| 2005/0091655 A1 | 4/2005 | Probert et al. | |
| 2005/0108570 A1 | 5/2005 | Gopalraj | |
| 2005/0120091 A1 | 6/2005 | Casais et al. | |
| 2005/0144482 A1* | 6/2005 | Anuszewski | G06F 21/41 726/4 |
| 2006/0059546 A1 | 3/2006 | Nester et al. | |
| 2006/0218630 A1 | 9/2006 | Pearson et al. | |
| 2006/0236382 A1 | 10/2006 | Hinton et al. | |
| 2006/0277596 A1 | 12/2006 | Calvert et al. | |
| 2007/0089167 A1 | 4/2007 | Villavicencio | |
| 2007/0147247 A1 | 6/2007 | Kalonji et al. | |
| 2007/0192326 A1 | 8/2007 | Angal et al. | |
| 2007/0220154 A1 | 9/2007 | El Husseini et al. | |
| 2008/0066159 A1 | 3/2008 | Dillaway et al. | |
| 2008/0113791 A1 | 5/2008 | Williams et al. | |
| 2008/0114883 A1 | 5/2008 | Singh et al. | |
| 2008/0294781 A1 | 11/2008 | Hinton et al. | |
| 2009/0037581 A1 | 2/2009 | Richardson et al. | |
| 2009/0037763 A1 | 2/2009 | Adhya et al. | |
| 2009/0047928 A1 | 2/2009 | Utsch et al. | |
| 2009/0089437 A1 | 4/2009 | Polozoff | |
| 2009/0132639 A1 | 5/2009 | Yan | |
| 2009/0216587 A1 | 8/2009 | Dwivedi et al. | |
| 2009/0292927 A1 | 11/2009 | Wenzel et al. | |
| 2010/0043062 A1 | 2/2010 | Alexander et al. | |
| 2010/0082989 A1 | 4/2010 | Bussard et al. | |
| 2010/0131755 A1 | 5/2010 | Zhu et al. | |
| 2010/0146611 A1 | 6/2010 | Kuzin et al. | |
| 2010/0154043 A1 | 6/2010 | Castellucci et al. | |
| 2010/0290392 A1 | 11/2010 | Rasanen et al. | |
| 2011/0010542 A1 | 1/2011 | Choi et al. | |
| 2011/0185421 A1 | 7/2011 | Wittenstein et al. | |
| 2011/0277019 A1 | 11/2011 | Pritchard, Jr. | |
| 2011/0307615 A1 | 12/2011 | Krishnaswamy et al. | |
| 2012/0078708 A1 | 3/2012 | Taylor et al. | |
| 2012/0106333 A1 | 5/2012 | Lee et al. | |
| 2012/0191842 A1 | 7/2012 | Hu et al. | |
| 2012/0254949 A1 | 10/2012 | Mikkonen et al. | |
| 2012/0254957 A1 | 10/2012 | Fork et al. | |
| 2012/0266229 A1 | 10/2012 | Simone et al. | |
| 2012/0291090 A1 | 11/2012 | Srinivasan et al. | |
| 2013/0036454 A1 | 2/2013 | Purvis et al. | |
| 2013/0073670 A1 | 3/2013 | Das et al. | |
| 2013/0086651 A1 | 4/2013 | Kavantzas et al. | |
| 2013/0086652 A1 | 4/2013 | Kavantzas et al. | |
| 2013/0198818 A1 | 8/2013 | Hitchcock et al. | |
| 2014/0068702 A1 | 3/2014 | Hyndman et al. | |
| 2014/0149280 A1 | 5/2014 | Karkhanis et al. | |
| 2014/0282961 A1 | 9/2014 | Dorfman et al. | |
| 2014/0304773 A1 | 10/2014 | Woods et al. | |
| 2014/0344326 A1 | 11/2014 | Kamath et al. | |
| 2015/0074407 A1 | 3/2015 | Palmeri et al. | |
| 2015/0082029 A1 | 3/2015 | Volchok | |
| 2015/0088978 A1 | 3/2015 | Motukuru et al. | |
| 2015/0089569 A1 | 3/2015 | Sondhi et al. | |
| 2015/0089570 A1 | 3/2015 | Sondhi et al. | |
| 2015/0089571 A1 | 3/2015 | Srinivasan et al. | |
| 2015/0089579 A1 | 3/2015 | Manza et al. | |
| 2015/0089580 A1 | 3/2015 | Manza et al. | |
| 2015/0089596 A1 | 3/2015 | Sondhi et al. | |
| 2015/0089597 A1 | 3/2015 | Srinivasan et al. | |
| 2015/0089604 A1 | 3/2015 | Mathew et al. | |
| 2015/0089614 A1 | 3/2015 | Mathew et al. | |
| 2015/0089617 A1 | 3/2015 | Sondhi et al. | |
| 2015/0089619 A1 | 3/2015 | Manza et al. | |
| 2015/0089620 A1 | 3/2015 | Manza et al. | |
| 2015/0089622 A1 | 3/2015 | Sondhi et al. | |
| 2015/0089623 A1 | 3/2015 | Sondhi et al. | |
| 2015/0150099 A1 | 5/2015 | Eguchi | |
| 2015/0220713 A1 | 8/2015 | Beenau et al. | |
| 2015/0220926 A1 | 8/2015 | McLachlan et al. | |
| 2016/0004870 A1 | 1/2016 | Forte et al. | |
| 2016/0065570 A1 | 3/2016 | Spencer, III et al. | |
| 2016/0219040 A1 | 7/2016 | Mathew et al. | |
| 2016/0232516 A1 | 8/2016 | Dayan et al. | |
| 2016/0248758 A1 | 8/2016 | Mathew et al. | |
| 2016/0285822 A1 | 9/2016 | Adams | |
| 2016/0380941 A1 | 12/2016 | Tanurdjaja et al. | |

(56) References Cited

U.S. PATENT DOCUMENTS

| | | | |
|---|---|---|---|
| 2016/0381000 | A1 | 12/2016 | Mathew et al. |
| 2017/0034152 | A1 | 2/2017 | Subramanya et al. |
| 2017/0085556 | A1 | 3/2017 | Mathew et al. |
| 2017/0118218 | A1 | 4/2017 | Koottayi et al. |
| 2017/0118222 | A1 | 4/2017 | Subramanya et al. |
| 2017/0118249 | A1 | 4/2017 | Motukuru et al. |
| 2017/0201524 | A1 | 7/2017 | Dureau |
| 2018/0077243 | A1 | 3/2018 | Mathew et al. |

FOREIGN PATENT DOCUMENTS

| | | |
|---|---|---|
| WO | 2015042546 | 3/2015 |
| WO | 2015042547 | 3/2015 |
| WO | WO2016051240 | 4/2016 |

OTHER PUBLICATIONS

Developing an Application to Manage Impersonation, Fusion Middleware, Developer's Guide for Oracle Access Management, Nov. 2012, 10 pages.
IBM Security Access Manager for Enterprise Single Sign-On, Available online at: http://www-03.ibm.com/software /products/en/access-mgr-esso, Nov. 10, 2016, 2 pages.
IBM Security Access Manager for Enterprise Single Sign-On, Retrieved from theInternet: URL: http:I/onwireco.com/wp-content/uploads/2013/12/IBM_Security_Access_Manager_For_Enterprise_Single_Sign-On.pdf, 2013, 8 pages.
Impersonate another user: Dynamics CRM 2015, Retrieved from the Internet:https://msdn. microsoft.com/en-us/library/gg334 7 44.aspx, 2015, 1 page.
Implementing Single Sign-On Across Multiple Organizations, Developer.force.com,http://wiki.developerforce.com/page/Implementing_Single_Sign-On_Across_Multiple_Organizations, Dec. 19, 2013, 8 pages.
Installing vCenter Single Sign-On in a multisite deployment, Retrieved from the Internet:http://kb.vmware.com/selfservice/microsites/search.do?language=en_US&cmd=displayKC&externalId=2034074, 2014, 2 pages.
Multiple Data Centers, Retrieved from the Internet: URL: https://support.ca.com/cadocs/0/CA%20SiteMinder%20 12%2052%205P1-ENU/Bookshelf_Files/HTMUidocs/index.htmtoc. htm706393.htmlintcmp=searchresultclick&resultnum =452, 2014, 8 pages.
Oracle Enterprise Single Sign-On Suite Plus 11gR2 PS2, Retrieved from the Internet:http://www.oracle.com/technetwork Imiddleware/id-mgmt/essosuite-technical-whitepaper-1519077.pdf, 2014, 25 pages.
Oracle Fusion Middleware Developing Web Applications, Using Sessions and Session Persistence, Retrieved from the Internet: URL:http://docs.oracle.com/cd/E12839_01/web.1111/e13712/sessions.htm#WBAPP301, May 2009, 6 pages.
Oracle Fusion Middleware Performance and Tuning for Oracle Weblogic Server, Retrieved from the Internet: URL: http://docs.oracle.com/cd/E12839_01/web.1111/e13814/webapptune.htm#PERFM368, 2015, 3 pages.
Symantec Identity: Access Manager, Retrieved from the Internet:URL: http://www.symantec.com/contenUen/us/enterprise/fact_sheets/bsymantec_identity_access_manager_DS_21227840, 2014, 2 pages.
The art of logging out, Available online at: https://www.kth.se/social/group/cas/page/the-art-of-logging-out, Apr. 26, 2013, 2 pages.
User Session Monitoring for CA Single Sign-On, Available online at: https://www.ca.com/content/dam/ca/us/files/service-offering/user-session-monitor-for-ca-single-sign-on.pdf, 2015, 1 page.
U.S. Appl. No. 14/135,053, Final Office Action dated Jul. 6, 2015, 17 pages.
U.S. Appl. No. 14/135,053, Non-Final Office Action dated Jan. 29, 2015, 16 pages.
U.S. Appl. No. 14/135,053, Non-Final Office Action dated Nov. 25, 2015, 18 pages.
U.S. Appl. No. 14/135,053, Notice of Allowance dated May 20, 2016, 10 pages.
U.S. Appl. No. 14/135,053, Notice of Allowance dated Aug. 31, 2016, 9 pages.
U.S. Appl. No. 14/137,775, Non-Final Office Action dated May 22, 2015, 10 pages.
U.S. Appl. No. 14/137,775, Notice of Allowance dated Sep. 16, 2015, 9 pages.
U.S. Appl. No. 14/491,076, Final Office Action dated Oct. 25, 2016, 19 pages.
U.S. Appl. No. 14/491,076, Final Office Action dated Oct. 6, 2016, 19 pages.
U.S. Appl. No. 14/491,076, Non-Final Office Action dated Mar. 11, 2016, 13 pages.
U.S. Appl. No. 14/754,222, Non-Final Office Action dated Dec. 1, 2016, 10 pages.
U.S. Appl. No. 14/754,222, Notice of Allowance dated May 17, 2017, 5 pages.
U.S. Appl. No. 14/814,209, Final Office Action dated Jul. 31, 2017, 19 pages.
U.S. Appl. No. 14/814,209, Non-Final Office Action dated Jan. 11, 2017, 13 pages.
U.S. Appl. No. 15/005,365, Final Office Action dated Mar. 10, 2017, 12 pages.
U.S. Appl. No. 15/005,365, Non-Final Office Action dated Aug. 24, 2016, 11 pages.
U.S. Appl. No. 15/143,240, Non-Final Office Action dated Jun. 5, 2017, 11 pages.
U.S. Appl. No. 61/880,335, filed Sep. 20, 2013.
U.S. Appl. No. 61/880,400, filed Sep. 20, 2013.
U.S. Appl. No. 61/880,569, filed Sep. 20, 2013.
U.S. Appl. No. 61/880,598, filed Sep. 20, 2013.
Ferguson et al., Session management server: Session transitions and state, Retrieved from the Internet: http://www.ibm.com/developerworks/tivoli/library/t-sms-states/, Jun. 25, 2007, 7 pages.
Gaur, IBM Extreme Transaction Processing (XTP) Patterns: Scalable and robust HTTP session management with WebSphere eXtreme Scale, Retrieved from the Internet:http://www.ibm.com/developerworks/websphere/ library/techarticles/0905_gaur/0905_gaur.html, May 27, 2009, 8 pages.
Haire, A Solution to SSO Authentication and Identity Management: Lessons Learned, Atlassian Blog, May 16, 2013, 5 pages.
Jive Software, Understanding Jive Mobile's SSO Compliance, Available online at: https://community.jivesoftware. com/docs/DOC-61829, Jun. 25, 2012, 11 pages.
Mortimore et al., Implementing Single Sign-On Across Multiple Organizations, Retrieved from the Internet: https://developersalesforce.com/page!Implementing_Single_Sign-On_Across_Multiple_Organizations, 2000-2014, 15 pages.
Murdoch, Hardened stateless session cookies, In International Workshop on Security Protocols, Springer Berlin Heidelberg, Apr. 2008, pp. 1-9.
Rivard, Clearing Novell Access Manager Application Sessions, Retrieved from the Internet: URL: https://www.netiq.com/communities/cool-solutions/clearing-novell-access-managerapplication-sessions/, Jan. 26, 2009, 4 pages.
Stirpe et al., Time-out Management in Multi-domain Single Sign-On, Retrieved from the Internet: <URL: http://www. strattagroup.com/tsg/pubs/ssotime-out.pdf, 2005, 13 pages.
Volodarsky et al., Fast, Scalable, and Secure Session State Management for Your Web Applications, Retrieved from the Internet: <URL: https://msdn.microsoft.com/enus/magazine/cc163730.aspx, 2015, 9 pages.
Ye, A complete Impersonation Demo in C#.NET, Retrieved from the Internet: URL:http://www.codeproject.com/ Articles /12581 0/A-complete-Impersonation-Demo-in-Csharp-NET, Jun. 20, 2013, 12 pages.
Configuring VMware Identity Manager for Multiple Data Centers, Technical White Paper: VMware Identity Manager 2.8, Available Online at https://www.vmware.com/content/dam/digitalmarketing/vmware/en/pdf/techpaper/vmware-identity-manager-multiple-data-center-configuration.pdf, Dec. 2016, 16 pages.
Dual Factor Authentication, Reliance, Oct. 24, 2016, 8 pages.
Multi-Data Center With Session Sharing, IBM Security Access Manager for Web, Version 7.0, Available Online at https://www.

(56) References Cited

OTHER PUBLICATIONS ibm.com/support/knowledgecenter/SSPREK_7.0.0/com.ibm.isam.doc_70/ameb_smsdeploy_guide/concept/c_multi_data_center with_session.html, 2017, 3 pages.
RSA Adaptive Authentication, RSA Security product literature, Available Online at https://www.rsa.com/en-us/products/fraud-prevention/3d-secure-authentication, 2016, 4 pages.
The ABCs of ADCs, White Paper: ABCs of Application Delivery, Available Online at https://www.fortinet.com/content/dam/fortinet/assets/white-papers/FortiADC-ABCs.pdf, 2014, 8 pages.
U.S. Appl. No. 14/814,209, Non-Final Office Action dated May 14, 2018, 20 pages.
U.S. Appl. No. 15/143,240, Notice of Allowance dated May 24, 2018, 15 pages.
U.S. Appl. No. 15/372,342, Notice of Allowance dated Mar. 13, 2018, 12 pages.
U.S. Appl. No. 15/782,700, Non-Final Office Action dated Jan. 26, 2018, 7 pages.
Nagalakshmi et al., Confident Multi-Factor Authentication on Web Application via Captcha Technologies, International Journal of Computer Engineering in Research Trends, vol. 2, Issue 8, Aug. 2015, pp. 516-522.
U.S. Appl. No. 14/491,076, Notice of Allowance dated Nov. 2, 2017, 11 pages.
U.S. Appl. No. 15/005,365, Notice of Allowance dated Sep. 27, 2017, 16 pages.
U.S. Appl. No. 15/143,240, Final Office Action dated Dec. 15, 2017, 14 pages.
U.S. Appl. No. 15/372,342, Non-Final Office Action dated Oct. 20, 2017, 14 pages.
Dacosta et al., One-Time Cookies: Preventing Session Hijacking Attacks with Stateless Authentication Tokens, ACM Trans. Internet Technol. 12, 1, Article 1, 2012, 31 pages.
Pujolle et al., Secure Session Management With Cookies, 7th International Conference on Information, Communications and Signal Processing (ICICS), 2009, pp. 1-6.
Samar, Single Sign-On Using Cookies for Web Applications, Enabling Technologies: Infrastructure for Collaborative Enterprises, (WET ICE '99) Proceedings. IEEE 8th International Workshops on, Stanford, CA, 1999, pp. 158-163.
U.S. Appl. No. 14/814,209, Final Office Action dated Jan. 4, 2019, 21 pages.
U.S. Appl. No. 14/814,209, Non-Final Office Action dated Aug. 19, 2019, 20 pages.
U.S. Appl. No. 15/291,804, First Action Interview Pilot Program Pre-Interview Communication dated Jan. 11, 2019, 4 pages.
U.S. Appl. No. 15/291,804, First Action Interview Office Action Summary dated Jun. 17, 2019, 5 pages.
U.S. Appl. No. 15/331,211, Non-Final Office Action dated Jun. 6, 2018, 26 pages.
U.S. Appl. No. 15/331,613, First Action Interview Office Action Summary dated May 29, 2019, 7 pages.
U.S. Appl. No. 15/331,613, First Action Interview Pilot Program Pre-Interview Communication dated Jan. 4, 2019, 5 pages.
U.S. Appl. No. 15/331,613, Notice of Allowance dated Aug. 21, 2019, 12 pages.
U.S. Appl. No. 15/331,613, Notice of Allowance dated Jul. 9, 2019, 19 pages.
U.S. Appl. No. 15/356,384, First Action Interview Pilot Program Pre-Interview Communication dated Feb. 8, 2019, 5 pages.
U.S. Appl. No. 15/15/356,384, Notice of Allowance dated Jun. 12, 2019, 9 pages.
U.S. Appl. No. 15/782,700, Notice of Allowance dated Aug. 8, 2018, 13 pages.
U.S. Appl. No. 15/784,029, Non-Final Office Action dated Aug. 22, 2019, 14 pages.
U.S. Appl. No. 16/140,343, Non-Final Office Action dated Aug 7, 2019, 11 pages.
Heo et al., "Statistical SIP Traffic Modeling and Analysis System", IEEE, 2010, pp. 1223-1228.
Izumi et al., "Toward Practical Use of Virtual Smartphone", IEEE 9th Asia-Pacific Symposium on Information and Telecommunication Technologies (APSITT), Dec. 12, 2012, pp. 1-5.
Maruyama et al., "Dynamic Route Selection Algorithms for Session Based Communication Networks", ACM, 1983, pp. 162-169.
Menasce et al., "Resource Management Policies for E-commerce Servers", ACM Sigmetrics Performance Evaluation Review, vol. 27, No. 4, Mar. 2000, pp. 27-35.

\* cited by examiner

Data Center 1 (DC1) 120

Session Management Engine 202

Session Activity Data 124 (USER1)

| Data Center 212 | Session 214 | Session Activity Status 216 | Last Known Activity 218 |
|---|---|---|---|
| Cluster ID - DC1 | Cluster ID:S1 | Inactive | 35 mins ago |
| Cluster ID - DC2 | Cluster ID:S2 | Active | 12 mins ago |

Session Adoption Data (Session S1) 122

| User ID 232 | Session ID 234 | Data Center 236 |
|---|---|---|
| USER1 | Cluster ID:S2 | Cluster ID - DC2 |

MDC Policies 240

FIG. 2

SESSION ACTIVITY TRACKING FOR SESSION ADOPTION ACROSS MULTIPLE DATA CENTERS

CROSS-REFERENCES TO RELATED APPLICATIONS

The present application is a continuation of, and claims the benefit of and priority to, U.S. patent application Ser. No. 14/754,222, filed on Jun. 29, 2015, now U.S. Pat. No. 9,769,147, and entitled "SESSION ACTIVITY TRACKING FOR SESSION ADOPTION ACROSS MULTIPLE DATA CENTERS," the entire contents of which are incorporated herein by reference for all purposes.

BACKGROUND

Generally, the present application relates to data processing. More specifically, the application is related to managing session activity of single sign-on (SSO) access for enterprise software spanning multiple data centers.

Enterprise computer networks are often spread over different computing data centers (DC). Each data center may be implemented by one or more server computers. The data centers can be geographically located together or dispersed. One or more server computers of a data center can implement an access management system to manage access for the data center. For scalability and high availability, multiple server computers can be deployed as a cluster in a data center. Multiple clusters across different data centers that are geographically disperse can be communicatively connected together to constitute a multi-data center (MDC) system. An MDC system addresses the high availability, load distribution and disaster recovery requirements of access servers.

An MDC system can operate as a single logical access server and can provide SSO functionality for all of the applications registered in the MDC system. Using a SSO session, a user can log into one data center and then access other data centers without logging in again for the same SSO session. For example, SSO allows a user to enter a username/password once by in order to gain access to multiple associated resources accessible from other data centers. Different data centers may manage access to different resources. As such, SSO can allow a user having access to one data center to access multiple resources from other data centers based on the SSO for the user.

A data center establishes user a SSO session for each user. A user request for one or more resources may hop across data centers within a single SSO session, requiring all the visited data centers to generate a session for the user. In an MDC system, an agent deployed on a client system may handle access requests to a server of a data center in an MDC system providing access to a resource. Each data center in an MDC system may manage access to different resources. As such, a request to access a particular resource may be directed to a data center controlling access to that resource. Based on the agent's primary access configuration for the client system and the geographic affinity of the client system to the data centers in an MDC system, authentication for a user for SSO prior to accessing a resource may be handled by one data center that is different from another data center that controls access to the resource. If authentication is granted, the authorization to access the resource may be directed to a different data centers responsible for access to the resource.

However, when authentication of a user for SSO and authorization to access a resource spans multiple data centers in an MDC system, multiple sessions will be created for the user, one for the data center that handles authentication and another for the data center that handles the authorization. In this scenario, the session activity for the user's SSO session is split between two data centers, one for authentication and one for authorization. When a SSO session is defined by a session time period, the data center that handled the authentication may detect that the session inactivity time period has been met when the user was active for a SSO session on a different data center, e.g., the data center that handles authorization for a resource. One data center that handles authentication may not be aware of the session activity of a user on a different data center that manages a session for access to a resource because a separate session is created at each data center that handles activity for a user including authentication and access to a resource. As such, the SSO session for a user at one data center may expire even though the same user was active for a session on a different data center. As a result, a user is burdened by having to provide credentials for a SSO session at a data center for re-authentication of the user in an MDC system.

New techniques are desired for managing session activity for SSO access across an MDC system. Further desired are techniques for enabling data centers to determine whether a user was active for a SSO session at other data centers.

BRIEF SUMMARY

The present disclosure relates generally to providing single sign-on (SSO) access among multiple data centers. Certain techniques are disclosed for managing session activity of SSO access across multiple data centers.

In certain embodiments, an access management system is defined that supports SSO sessions across multiple data centers. In particular, the access management system can manage session activity of SSO access across multiple geographically disperse computing systems (e.g., servers) that are clustered together to form a multi-data center (MDC) system including multiple data centers. Each of the data centers in the MDC system may manage access to one or more resources, some of which may be different. Authentication for a user may be managed at one data center in the MDC system that has a geographical affinity to the client device operated by the user. The authentication of the user may be preserved for the user to achieve SSO access in the MDC system based on session activity of the user at any of the data centers in the MDC system.

To manage session activity for a session across multiple data centers, techniques for session adoption may be implemented by the data centers in the MDC system. In some embodiments, a first data center that performs the authentication for a user may establish an initial session for SSO access. The first data center may manage session adoption of subsequent sessions that are established at other data centers in the MDC system to access resources. Other data centers (e.g., a second data center) may create a session to provide the user with access resources at those data centers. A session may be created other data centers based on requesting session adoption information of the session created at the first data center for authentication.

The first data center may manage session activity across adopted sessions by obtaining session activity data from each session that is adopted for the user. The data center (e.g., the first data center) that keeps track of the session adoption may determine whether the session is active across the data centers. The data center may determine whether the session is active based on the session activity of the user at the data center that performs authentication and the other data centers providing access to the user for resources. Based on the session activity determined using session adoption, a user may maintain SSO access at multiple data centers. Authorization to access a resource at a data center in the MDC system may be granted based on the status of the SSO session using session adoption among the data centers.

In some embodiments, session adoption may be implemented by a computing system. The computing system may be part of a data center in an MDC system. The computing system may be configured to implement methods and operations described herein. In at least one embodiment, a method may include establishing a first session for a user at a first computing system, wherein the first session is established based on authentication of the user. The method may include receiving, by the first computing system, from a second computing system, a session adoption request for the first computing system to adopt a second session for the first session. The second session may provide the user with access to a resource managed by the second computing system. The method may include, based upon receiving the session adoption request, sending, to the second computing system, session data corresponding to the first session for the user. The second session may be established using the session data for the user at the second computing system. The method may include storing, by the first computing system, session adoption data indicating an association between the second session and the first session for the user. The method may include detecting that the first session has expired. The method may include requesting, based on the session adoption data, session activity data of the second session from the second computing system. The method may include determining, based on the session activity data, that the second session has not expired. The method may include, upon determining that the second session has not expired, providing authentication to the user for the first session. Authorization for the user to access the resource is provided based on authentication of the user.

In at least one embodiment, the first session is different from the second session. The second session may be established based on determining authorization for the user to access the resource.

In some embodiments, wherein requesting session activity data includes: identifying, based on the session adoption data, the second session as adopted by the first session; sending a request to the second computing system for the session activity data of the second session for the user; and receiving the session activity data from the second computing system.

In some embodiments, detecting that the first session has expired includes determining, based on the session activity, that the first session is inactive for a threshold time period. The authentication of the user to the first session may be based on satisfying the threshold time period. Authentication may be provided to the user for the first session based on determining, using the session activity data, that the second session is active for the threshold time period. The session activity data may indicate that the second session has not expired. The second session may have expired when the second session is active for the threshold time period.

In at least one embodiment, the method may further include receiving, by the first computing system, from a third computing system, a session adoption request for the first computing system to adopt a third session for the first session. The third session may provide the user with access to a resource managed by the third computing system. The resource managed by the third computing system may be different from the resource managed by the second computing system. The session adoption data may be updated to indicate an association between first session, the second session, and the third session for the user. Based on the session adoption data, session activity data of the third session may be requested from the third computing system. The method may include, upon determining that the first session has expired and that the second session has expired, determining, based on the session activity data, that the third session has not expired. Upon determining that the third session has not expired, authentication may be provided to the user for the first session.

Yet other embodiments relate to systems and machine-readable tangible storage media which employ or store instructions for methods and operations described herein.

The foregoing, together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 2 shows a more detailed high level diagram of a data center managing session activity of single sign-on access across multiple data centers in accordance with an embodiment.

DETAILED DESCRIPTION

Figure 1:
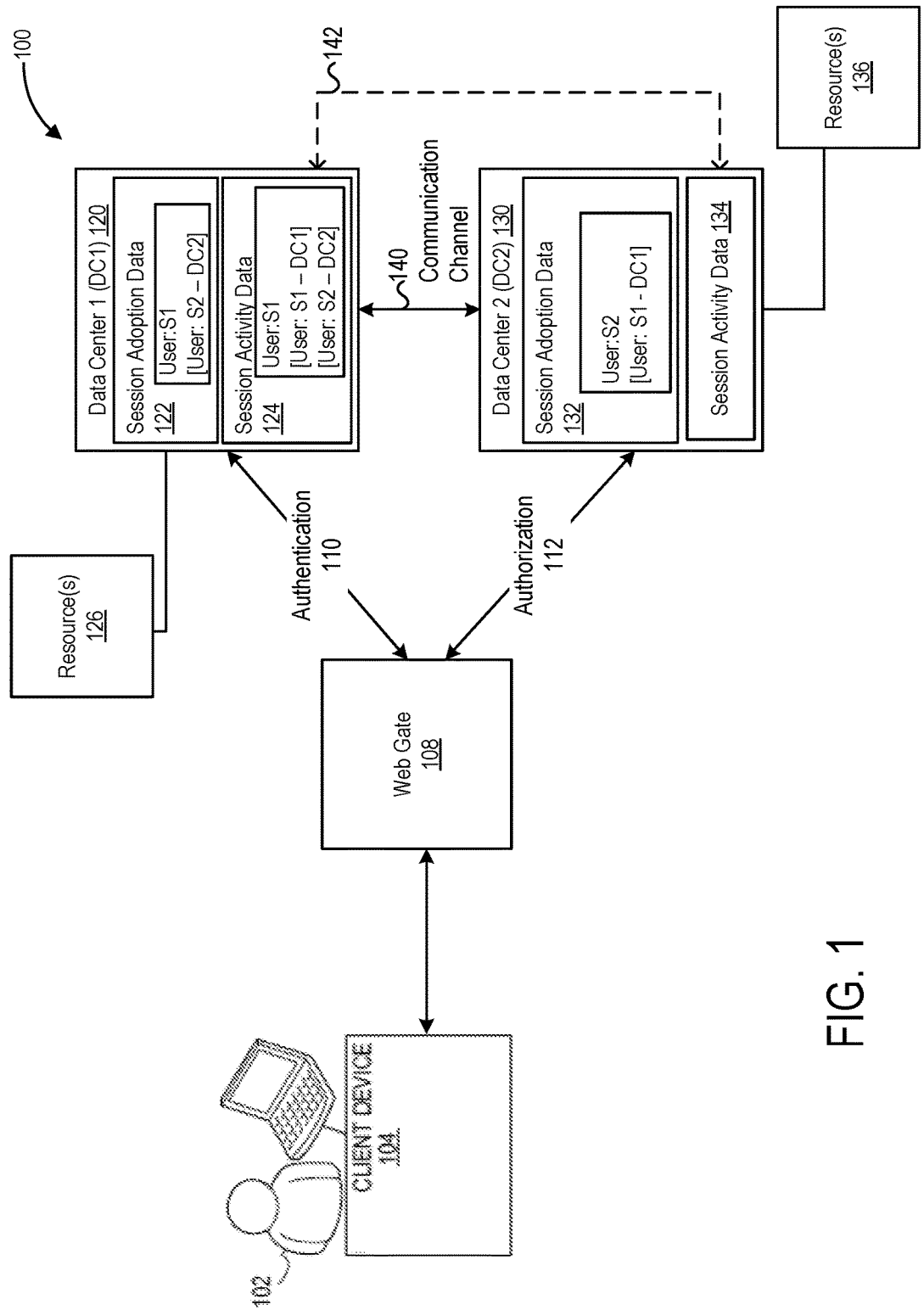
FIG. 1 illustrates a system for managing session activity of single sign-on access across multiple data centers in accordance with an embodiment.

In the following description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The present disclosure relates generally to providing single sign-on (SSO) access among multiple data centers. Certain techniques are disclosed for managing session activity of SSO across multiple data centers. SSO may enable a user to log into one data center and then access other data centers using the same authentication session without re-logging in each time a different data center is accessed. For example, SSO allows a user to enter a username/password once in order to gain access to multiple resources located across different data centers.

Managing SSO access across data centers may enable a user to access different resources whose access is controlled by different data centers. Data centers may be dispersed over different geographic locations and communicatively connected via an enterprise computer network. Various resources included within an enterprise computer network may be managed and/or stored by the different data centers. For example, a first resource may be stored and managed by a first data center, and a second resource may be stored and managed by a second data center. Resources may include any item managed and/or stored by the data centers and available for access by one or more users, such as an application, a document, a file, and/or the like. A user may have to be authenticated by a first data center in order to access the first resource at a second data center and may have to be authorized by the second data center in order to access the first resource. In some embodiments, authentication may be performed by one data center and authorization to access a resource may be controlled by a different data center.

As described above, when authentication of a user for SSO and authorization to access a resource spans multiple data centers, multiple sessions may be created for the user. In this scenario, the session activity for the user's SSO session may be split between two data centers such that the user's session is not coordinated between various data centers involved for authentication and authorization. When a SSO session is restricted by session activity, such as session inactivity, one data center may not be able to detect session activity for the user of the SSO session on other data centers utilized by the user during the SSO session. Accordingly, various systems and techniques are needed for managing session activity across data centers to enable a SSO session to be maintained for activity involving multiple data centers.

In some embodiments, systems, methods, and computer-readable media are disclosed for managing session activity of SSO access across multiple data centers. FIG. 1 illustrates a system 100 for managing session activity of SSO access across multiple data centers in accordance with an embodiment. Specifically, system 100 provides SSO access among different data centers communicatively connected within an enterprise computer network. For example, a user 102 ("USER1") operating a client device 104 may access an enterprise computer network with multiple geograpchially dispersed data centers, such as data center 1 (DC1) 120 and data center 2 (DC2) 130. Client device 104 may be a workstation, personal computer (PC), laptop computer, smart phone, wearable computer, or other networked electronic device.

Each of DC1 120, DC2 130 may include applications, web gates, and an access management system, along with other infrastructure, such as identity stores, databases, or the like. An access management system may include one or more access manager servers configured to implement an access manager, such as a product offered by Oracle® corporation. A data center may manage access to one or more resources. For example, DC1 120 may manage access to one or more resources 126 and DC2 130 may manage access to one or more resources 136. Some resources may only be accessible from a data center dedicated to manage those resources. As such, a request for a resource managed by a data center may have to be routed to that data center to access the resource.

A data center (e.g., DC1 120 or DC2 130) may be implemented using a computing system. The computing system may include one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up a data center may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. A data center may be implemented using hardware, firmware, software, or combinations thereof.

Multiple access manager servers can be deployed as an access manager cluster in a data center, which allows for scalability and high availability. Multiple such geographically dispersed data centers with access manager server clusters can be connected (wired or wirelessly) to constitute a multi-data center (MDC) system. For example, DC1 120 and DC2 130 may constitute an MDC system. An MDC system may satisfy high availability, load distribution, and disaster recovery requirements of access servers within an enterprise computer network. An MDC system may act as a single logical access server and provides SSO functionality for all of the resources registered in the MDC.

Before implementation of system 100, to manage session activity across data centers to enable SSO across those data centers, back end user sessions at different data centers that service a user may have been tracked by an originating data center that establishes an initial SSO session. Synchronization of the databases among these data centers of an MDC system may not be practical due to latencies involved in transmitting data between the geographically dispersed databases. Accordingly, techniques disclosed herein enable one data center (e.g., DC1 120) in an MDC system to track session activity at another data center (e.g., DC2 130) of the MDC system by implementing session adoption. DC1 120 may adopt a session from DC2 130 to track session activity for an SSO session of user 102 at multiple data centers DC1 120 and DC2 130 in an MDC system. For purposes of illustration, "session" is described herein as a SSO session; however, a session as described herein may include other types of sessions.

In some embodiments, an access management system may be implemented in system 100 according to an agent-server model for communication between client device 104 and any one of DC1 120, DC2 130. The agent-server model may include an agent component and a server component. The agent component may be deployed on a host system and the server component may be deployed on a server, e.g., an access manager server of a data center.

Communication between an agent and a server may be split into two different channels of communication. For example, communication via a front-channel may use a hypertext transfer protocol secure (HTTPS) protocol. Front-channel communications may include less frequent communications, such as communications for credential collection operations for authentication. Communication via a back-channel 140 may use an open access protocol (OAP). Back-channel communications may include more frequent communications, such as agent-server interactions including requests for access to a resource managed by a data center. Each channel may communicate using an access token designed for the type of communication over the channel. Either or both communication channels may be used to retrieve session data for a SSO session from another data center. The access flow may generate two types of browser tokens. A first token is an access management ID token (e.g., OAM ID token), which serves the SSO requests that are being propagated over HTTP. A second token is an authorization token (e.g., OAMAuthn Token) that may be used to server the SSO requests that are being propagated over OAP. The browser tokens may be stored as host cookies. The access management ID token may not be readable by an agent, and the authorization token may not be readable by a server of a data center.

In system 100, a web gate (e.g., web gate 108) may provide employee access control and may operate to protect a data center and any resources within the data center against external and internal web-based threats. For example, DC2 130 may control access to resource(s) 136. Web gate 108 may implement or operate as the agent component a data center may include a server that operates as the server component. Each resource accessible by a data center may be protected through an agent of the web gate. Each agent may be associated with a particular data center with which the resource is stored and/or managed. The associated data center for an agent may be referred to as the web gate agent's end point. The web gate agent may intercept user requests for one or more resources protected by it and check for user credentials in order to authenticate the user. The agent may then contact a server, e.g., an access manager server at a data center. The access management server may be implemented by a data center to verify whether the resource is a protected resource that requires credentials for access. If the access management server determines that the resource is not protected, the agent will grant access to the user. If the resource is protected, the agent will challenge the user for authentication credentials.

An access management system enables SSO functionality within DC1 120, DC2 130 and may perform various session related functions for managing access to DC1 120, DC2 130. For example, an access management system on DC1 120 may perform authentication of a user (e.g., user 102) operating a client device (e.g., client device 104). Authentication is a process by which a user verified to determine that he/she is who he/she claims to be. To authenticate a user, an access management system (e.g., using a web gate) may present a user with a request for authentication credentials in the form of a challenge (e.g., via the user's web browser). Authentication policies may specify the authentication methodology to be used for authenticating the user for whom the access must be provided on a given resource. The policies define the way in which the resource access is to be protected (e.g., type of encryption, or the like). An access management server on DC2 130 may determine authorization of a user to access a resource (e.g., resource 150). Authorization is the process of determining if a user has a right to access a requested resource. Authorization policies may be defined that specify the conditions under which a user or group of users has access to a resource. For example, an administrator may only authorize certain users within a group to access particular resources.

A data center may identify each user session uniquely by generating a separate session for the user at the data center. In an MDC system, a user request for one or more resources can hop across multiple data centers within a single SSO session, resulting in each of the requested data centers to generate unique sessions for servicing the user requests. In some embodiments, a server of a data center may implement a session management engine to manage different sessions for SSO across multiple data centers. In some embodiments, the data center that authenticates the user may manage the different sessions.

FIG. 1 illustrates an example of a SSO session managed across multiple data centers DC1 120, DC2 130 implementing session adoption to track session activity. For example, user 102 may operate client device 104 to request access to resource 136 controlled by DC2 130. The request may be routed to web gate 108, which controls access to data centers including DC1 120 and DC2 130. DC1 120 and DC2 130 may be geographically separated such as in an MDC system. In some embodiments, some resources managed by a data center may not protected, in which case web gate 108 may query an access management server of the data center to determine if the requested resource is protected. The access management server may authenticate the user 102 upon receiving the proper authentication credentials by validating the credentials against those stored in a user directory. Web gate 108 may choose a data center to perform authentication for a SSO session. In this example, based on the geographic affinity of client device 104 to DC1 120, web gate 108 requests authentication 110 to be performed by DC1 120.

DC1 120 may determine whether any session exists for user 102. Upon determining that no session has been established for user 102, DC1 120 may request web gate 108 to obtain authentication credentials (e.g., user name/password, or the like) from user 102. Based on receiving authentication credentials for user 102, DC1 120 may perform authentication, and establish a first session ("S1") for user 102 upon authentication of user 102. As a result, user 102 is logged into DC1 120 for S1. Once logged in, user 102 may access resources to which the user is authorized to access, such as running different applications, accessing cloud storage, or the like. Once user 102 is logged into 120, the access manager server of DC1 120 creates a cookie that tracks session activity for user 102. The cookie may include a length of time that the user has been active on a session. The cookie may be stored as session activity data 124 at DC1 120.

Upon determining that user 102 is authenticated for a SSO session, web gate 108 may process the original request for resource 136 by directing an authorization request 112 to DC2 130. In this example, authentication may be requested from a data center, DC2 130, different from DC1 120 because resource 136 is controlled by DC2 130. Upon attempting to access resource 136, DC2 130 may determine that user 102 does not yet have a session on DC2 130. In some embodiments, when authorization request 112 reaches DC2 130, DC2 130 may determine that a valid session is not present in DC2 130 and that DC1 120 and DC2 130 are implemented in an MDC system based on MDC policies (explained further below).

In some embodiments, DC2 130 may implement session adoption 142 to adopt a session from another data center, e.g., DC1 120. DC2 130 may initiate a session adoption request to DC1 120 to determine whether a valid session has already been established for user 102 at another data center in the MDC system and if so, whether that session should be adopted. For example, DC2 130 may send a session adoption request via communication channel 140 to one or more data centers, e.g., DC1 120, in the MDC system. The session adoption request may include an identifier of a requesting data center (e.g., DC2 130). The session adoption request may request information about an existing session for user 102, if any, to be adopted by DC2 130.

DC1 120 upon receiving the session adoption request, may determine whether S1 for user 102 is valid and active. DC1 120 may store session adoption data 122 indicating one or more data centers, e.g., DC2 130, that have requested adoption with S1. Session adoption data may indicate an association between S1 and sessions created at other data centers for user 102. DC1 120 may provide DC2 130 with session data about S1 for user 102.

DC2 130 may create a second session ("S2") for user 102 based on session data about S1 received from DC1 120. In some embodiments, DC2 may store session adoption data 132 that indicates sessions adopted by other data centers, e.g., S1 of DC1 120 which adopted S2. Session adoption data 132 may be used by DC2 130 to determine data centers that have adopted a session. Session activity data 134 may be sent to those data centers that are identified as adopting a session. DC2 130 may maintain its own session activity for S2 in session activity data 134. Since S2 is created based on S1, S2 can adopt the authentication of S1, thereby preventing user 102 from being prompted to provide authentication credentials.

Session activity data managed by a data center may be used by the data center to determine whether a session is active (e.g., active for a threshold time period) according to one or more session policies. In some embodiments, in an MDC system, activity for a SSO session may be spread across different data centers. In such instances, session adoption 142 may be utilized to determine session activity on different both DC1 120 and DC2 130. In the example above, S1 may be established based on authentication of user 102 and S2 may be established to provide access to resource 136. In this scenario, session activity on S1 may be minimal if resource 126 is not requested by user 102, while session activity on S2 may be greater if user 102 continues to access resource 136.

At some future point in time, S1 may need to determine re-authentication of S1 when S1 reaches a threshold time period. In this scenario, DC1 120 may iterate through session adoption data 122 to identify adopted sessions at one or more data centers. For example, DC1 120 may identify S2 at DC2 130 as an adopted session for which to assess session activity. DC1 120 may request DC2 130 to provide session activity data 132 for S2 to assess session activity for re-authentication. In one example, based on determining that S2 is active (e.g., satisfies the session policies of S1), DC1 120 may re-authenticate S1. In some embodiments, DC1 120 may send a message to inform web gate 108 that S1 is re-authenticated and remains active, thereby permitting requests for resources to be processed and preventing re-authentication of user 102.

FIG. 2 shows a more detailed high level diagram 200 of DC1 120 for managing session activity of SSO access across multiple data centers, e.g., DC1 120 and DC2 130, in accordance with an embodiment. DC1 120 may include several subsystems and/or modules. In some embodiments, DC1 120 may include a session management engine 202, which may be implemented in software (e.g., program code, instructions executable by a processor), in hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

DC1 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in DC1 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

DC1 120 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, DC1 120 is coupled to or includes one or more data stores for storing data such as session data, session activity data 124 for one or more users (e.g., "USER1") and session adoption data 122 for one or more users. In some embodiments, data related to session adoption may be stored in a session object including information about a session for which adoption has occurred. In another example, DC1 120 is coupled to or includes a data store for one or more multi-data center (MDC) policies 240 (herein referred to as "MDC policies"). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Referring back to FIG. 1, when a request from a client device 104 for authentication (e.g., authentication or re-authentication) of a user reaches DC1 120, DC1 120 may determine whether a SSO session was previously created for the user. Session management engine 204 of DC1 120 may use session data stored on DC1 120 to determine whether a session was created for user. Upon determining that a session was created, session management engine 204 may assess whether the session is active using session activity data 124. DC1 120 may store session activity data 124 for sessions established by DC1 120 and those sessions adopted from other data centers. Upon determining that the session is active, authentication for the user is verified.

In some embodiments, session management engine 240 may determine whether a session is active using one or more MDC policies 240. MDC policies 240 may indicate criteria (e.g., a session time period) for mainting session activity. MDC policies 240 may be configured by an administrator. For example, an MDC system may be configured by one or more policies that apply to all data centers within an MDC system. The MDC policies may be stored in a data center configuration file with configuration values indicating whether one or more available policy options are applicable to the MDC system.

One or more MDC policies 240 may be configured to define session adoption for the MDC system. One example of an MDC policy is a session adoption policy. A session adoption policy may direct a data center to authenticate a user for a session based on session data of a session created for the user at a different data center. The policy may indicate one or more requirements for session adoption including a session time period (e.g., session inactivity period). Session data obtained from another data center for adoption may be processed to determine whether the session identified in the session data satisfies the MDC policy.

Upon determining that a session previously created for a user is no longer active, session management engine 240 may determine whether a scenario exists in an MDC system such that an adopted session for the user exists at another data center. In some embodiments, an MDC policy may indicate that session adoption can be implemented such that sessions can be adopted from other data centers in an MDC system, such as shown in FIG. 1. For session adoption, based on an applicable MDC policy, DC1 120 may identify one or more data centers that have an active session for a user. Session management engine 240 may request session data from data center(s) that have an active adopted session. The request may ask for session data about the active adopted session(s). The session data may include session activity data about the session. In some embodiments, the session data may indicate whether the session(s) identified for a user is active.

As explained above and further below, upon session management engine 204 discovering of a session for a user at another data center, the discovered session may be adopted for an existing session of the user at DC1 120. For example, S2 for USER1 created at DC2 130 may be adopted by DC1 120 for existing S1 associated with USER1. Since S1 was created first for an authentication request at DC1 120, session management engine 204 may adopt sessions (e.g., S2 for USER1) created for the same user at other data centers. In this example, because a resource is accessible from a different data center than the one which manages authentication, multiple sessions may be created in an MDC system. As such, session management engine 204 may perform session adoption to be able to determine session activity of a user spread across different sessions at data centers in an MDC system.

Session management engine 240 may store session adoption data 122 indicating an association between the adopted sessions and the session (S1) for authentication established at DC1 120. Session adoption data may include one or more records, each corresponding to a session adopted for a user. Each record may include one or more fields. In the example of FIG. 2, a record is shown including a user ID (e.g., field 232) for "USER1," a session ID (e.g., field 234) indicating an adopted session "Cluster ID:S2" and a data center (e.g., field 236) identifying DC2 for a cluster of data centers identified by "Cluster ID." Each of records in session adoption data 122 for S1 may be associated with S1 for session adoption. The association between sessions may be based on data identifying sessions in a cluster of data centers (e.g., cluster ID) to which the data centers of the adopted sessions belong.

In some embodiments, session management engine 204 may manage session data received from one or more data centers for adoption. The session data may indicate information about a session and may include session activity data about the session. Some of the session data may be stored as session activity data 124 for a session associated with a user (e.g., USER1). As discussed further below, session activity data may be received from a data center having an adopted session. The session activity data may be received upon request or periodically via transmission from the data center having the adopted session.

FIG. 2 shows an example of session activity data 124 for a user (USER1). Session activity data 124 may include one or more records, each corresponding to session activity for a session at DC1 120 or an adopted session. For example, a record of session activity data 124 may include a data center identifier (e.g., field 212), a session identifier (e.g., field 214), a session activity status (e.g., field 216), and a last known activity (e.g., field 218). Session activity status 216 may indicate whether a session identified by field 214 for a record is active or inactive as reported by a data center indicated by field 212 in the record. A last known activity 218 may indicate a time since last known activity at the session occurred. Session management engine 204 may save session activity data received for an adopted session for reuse later to determining session status. Although not shown, session adoption may occur with multiple data centers, such that session activity data may indicate session activity received from multiple data centers that each have adopted a session.

Figure 3:
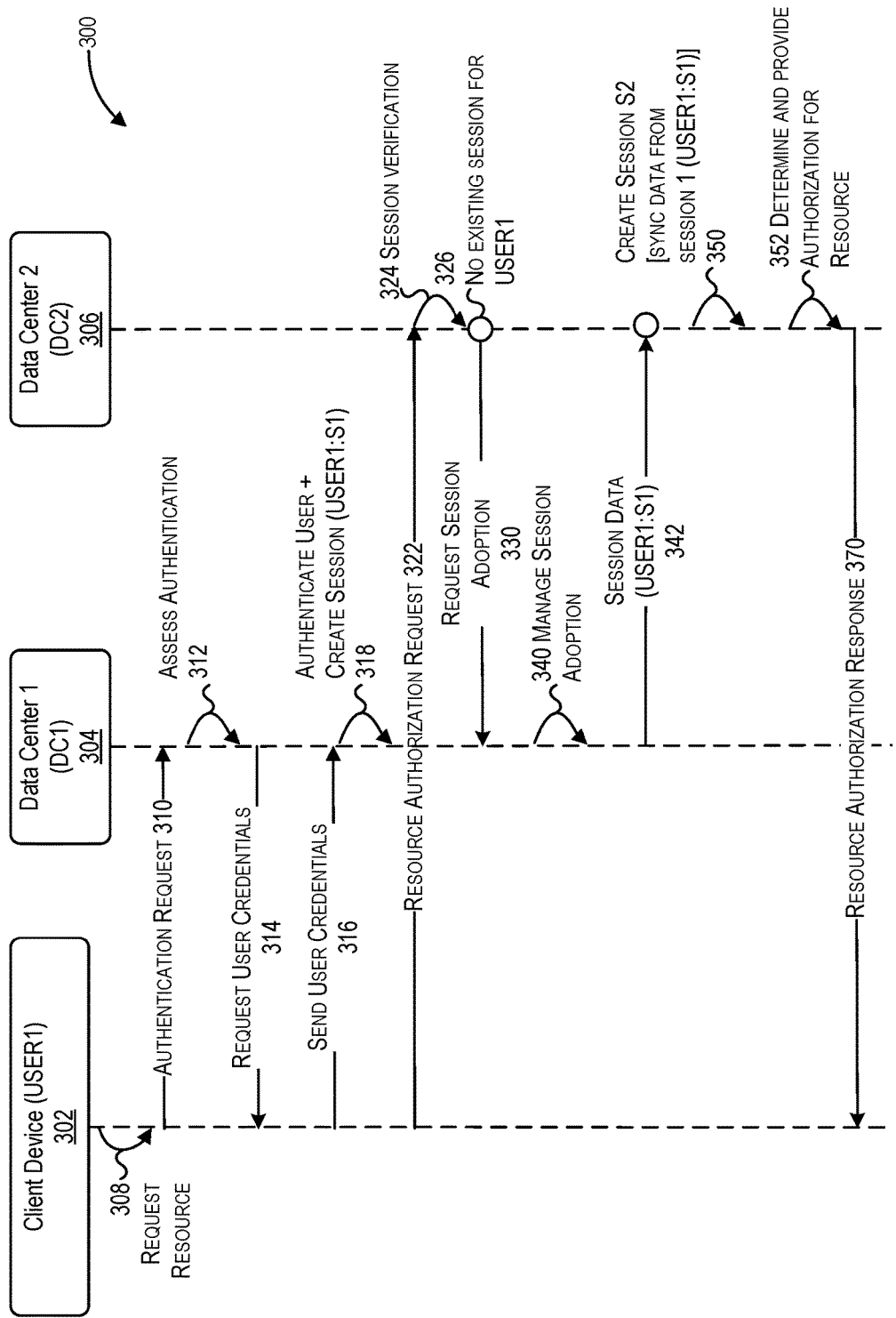
FIG. 3 illustrates a sequence diagram showing operations for managing session activity of single sign-on access across multiple data centers in accordance with an embodiment.
Figure 4:
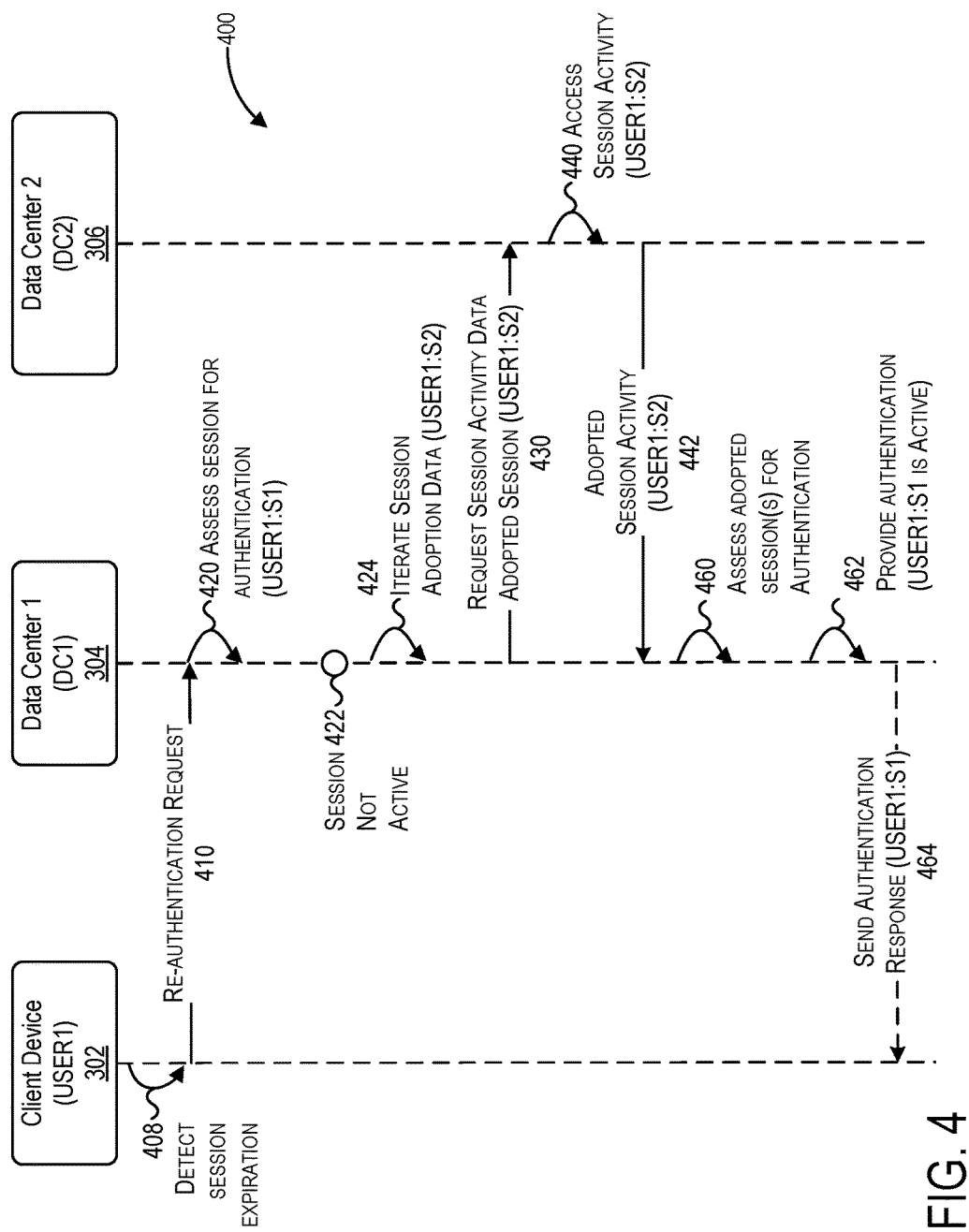
FIG. 4 illustrates a sequence diagram showing operations for managing session activity of single sign-on access across multiple data centers in accordance with an embodiment.
Figure 5:
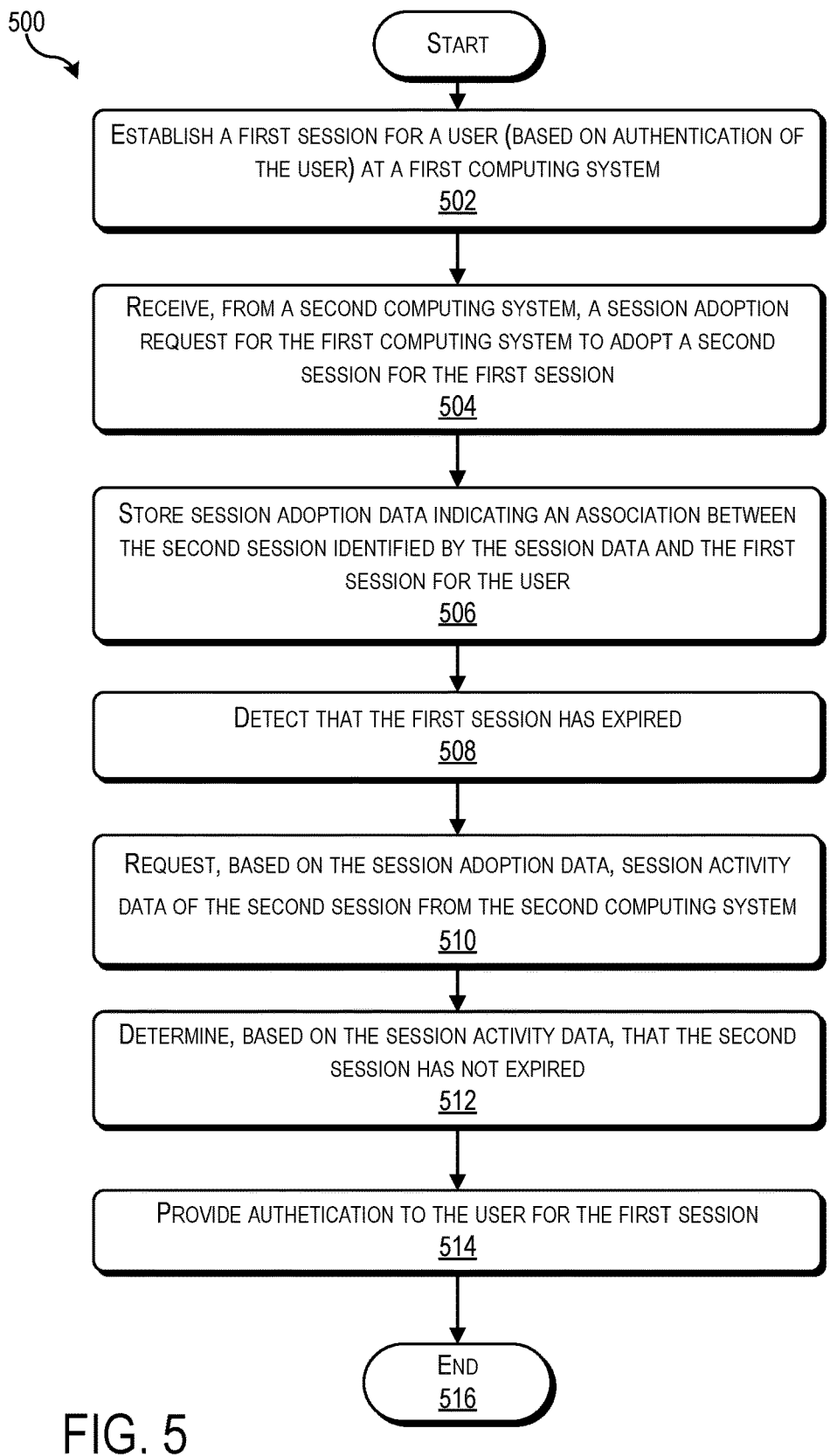
FIG. 5 depicts a flowchart illustrating a process for managing session activity of single sign-on access across multiple data centers in accordance with an embodiment.

FIGS. 3-5 illustrates processes and operations for managing session activity of SSO access across multiple data centers according to some embodiments of the present invention. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIGS. 3-5 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 3-5 is not intended to be limiting. Other sequences of steps may also be performed according to alternative embodiments. For example, alternative embodiments of the present invention may perform the steps outlined above in a different order. Moreover, the individual steps illustrated in FIGS. 3-5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 illustrates a sequence diagram 300 showing operations for managing session activity of SSO access across multiple data centers, e.g., data center 1 (DC1) 304 and data center 2 (DC2) 306, in accordance with an embodiment. Specifically, FIG. 3 shows DC2 306 requesting session adoption from DC1 304 for S1 and establishing S2 based on S1 adopted from DC1 304. DC1 304 and DC2 306 may form all or part of an MDC system. In at least one embodiment, DC1 304 is DC1 120 and DC2 306 is DC2 130. Starting at 308, a user ("USER1") operating client device 302 requests 308 a resource for which access is managed by DC2 306.

A web gate (e.g., web gate 108) for client device 302 may implement or operate as an agent to protect access to a resource provided by a data center, e.g., DC2 306. The agent may be configured to communicate with one or more agent endpoints (e.g., a server of a data center) of the agent. For example, the agent may be configured to communicate with an endpoint at DC1 304 to perform authentication for USER1 on client device 302 due to the client device's geographic affinity to DC1 304. The agent may be configured to communicate with an endpoint at DC2 306 to perform authorization for access to a resource controlled by DC2 306. The agent may intercept user requests for one or more resources protected by it and check for user credentials in order to authenticate the USER1 for a session at DC1 304 and to authorize USER1 for access to a resource controlled by DC2 306.

At 310, an agent controlling access for client device 302 may then contact an agent endpoint (e.g., an access manager server at a data center) to determine authentication of USER1. For example, an authentication request is sent to DC1 304 to determine authentication of USER1 to access a resource managed by DC2 306. At 312, DC1 304 may assess whether a valid session exists for USER1 at DC1 304 or any other data center, e.g., DC2 306. DC1 304 may assess the session based on consideration of one or more MDC policies indicating session adoption in an MDC system. Once it is determined that a user does not have a valid session at DC1 304, USER1 at client device 302 may be challenged for user credentials to determine authentication of a session. In this example, DC1 304 assesses that USER1 does not have a valid session. USER1 may not have a session because the request for authentication is the first request by USER1.

At 314, DC1 304 sends a request to client device 302 to challenge USER1 for credentials. At 316, USER1 operates client device 302 to send credentials to DC1 304. At 320, DC1 304 verifies whether the credentials are valid for USER1. DC1 304 further authenticates the user based on validating the credentials and creates a session (e.g., a SSO session) having session ID "S1." In some embodiments, DC1 304 generates a cookie that includes session information about S1 for USER1. The cookie may be sent to client device 302 and stored at client device 302 for use in future requests to identify S1 for USER1. DC1 304 may send the cookie back to client device 302 via the agent.

At 322, the agent protecting access to the resource requested by USER1 may send a resource authorization request for the resource. The request may be directed to DC2 306 protecting access to the resource. At 324, DC2 306 may perform session verification to determine whether DC2 306 has a valid session for USER1 to access the resource. At 326, DC2 306 determines that there is no existing session for USER1. DC2 306 may further assess session adoption based on an MDC policy instructing DC2 306 in an MDC system to adopt a session (e.g., S1) previously created for USER1 at DC1 304. At 330, DC2 306 may send a request for session adoption 330 based on an MDC policy indicating session adoption. The request may include information identifying DC2 306 as a data center that is adopted for S1. The request may indicate user information to identify USER1 for which session adoption is requested.

In some embodiments, D1 304 may receive a session adoption request from multiple data centers in an MDC system. For example, DC1 304 may receive a session adoption request from a third data center (e.g., DC3) requesting DC1 304 to adopt a third session for S1. DC3 may request session adoption to determine whether a valid session exists for USER1 to access a resource controlled by DC3. The resource controlled by DC3 may be different from the resource controlled by DC2 306.

At 340, DC1 304 may perform operations to manage session adoption for USER1 at DC1 304. Those operations may include determining based on the request at 330, whether a S1 can be adopted for USER1 at DC2 306. MDC policies may be assessed to determine requirements for session adoption. In this example, DC1 304 determines that an existing session S1 for USER1 can be adopted by DC2 306. Based on determining that S1 for USER1 can be adopted by DC2 306, DC1 304 may accordingly manage (e.g., store, create, or update) session adoption data stored at DC1 304 to indicate that DC2 306 is adopting a session (e.g., S1) for USER1. DC1 304 may update session adoption data to indicate an association between S1 and other sessions (e.g., S2) adopted from other data centers indicated by a session adoption request.

At 342, DC1 304 may send session data about S1 for USER1 to DC2 306. The session data may include synchronization data for synchronizing S1 with S2. The session data may indicate a status of S1 at DC1 304. At 350, DC2 306 may create a session having session ID "S2" based on session data for S1. DC2 306 may perform validation and synchronization of S1. DC2 306 may store information indicating an association between S1 and S2 for USER1.

At 352, DC2 306 may determine authorization for the resource authorization request at 322, and if authorized, access to the resource may be granted to USER1. Authorization may be determined based on validity of S1 adopted for S2. Upon determining that S1 is valid based on a session policy for S1, DC2 306 determines that USER1 is authenticated. Once USER1 s authenticated, DC 306 determines whether the access granted to USER1 includes access to the resource originally requested at 308. Upon determining that S1 is not valid, DC2 306 determines that USER1 is not authenticated and therefore not authorized to access the resource, in which case DC2 306 may request credentials from USER1. DC2 306 may communicate 370 with client device 302 by sending a resource authorization response based on the authorization determined at 352. The resource authorization response may indicate whether access to the resource has been provided.

In the examples described above, session activity may be tracked by either or both of DC1 304 for S1 and DC2 306 for S2. Based on the requirement(s) (e.g., a threshold session time period) for a session, DC1 304 and DC2 306 may evaluate session activity for USER1 to determine whether the requirement(s) is/are being met. For example, DC1 304 may determine whether S1 is active based on session activity at DC1 304 and session activity at DC2 306 using session adoption data. As further discussed below, DC1 304 can obtain session activity data from other data centers identified as having an adopted session indicated by session adoption data stored by DC1 304.

By enabling one data center in an MDC system to adopt a session for a user from another data center, SSO can be implemented across multiple data centers in an MDC system. The techniques describes above with reference to FIG. 3, reduce processing time for establishing a session for a user at different data centers where access to resources spans across many data centers. Session adoption enables an existing session to be used by other data centers to establish a session without having to re-authenticate a user to determine authorization to access a resource. AS a result, a user may not be burdened by having to provide credentials to access different resources controlled by different data centers in an MDC system supporting SSO sessions.

Now turning to FIG. 4, a sequence diagram 400 is illustrated to show operations for managing session activity of SSO access across multiple data centers 304, 306 in accordance with an embodiment. Specifically, FIG. 4 shows how DC1 304 utilizes session adoption to determine session activity at other data centers in an MDC system to assess session activity for authentication. Some examples described with reference to FIG. 4 are based on examples described with reference to FIG. 3.

In FIG. 4, an agent, such as one described above for client device 302, may control access to DC1 304 and DC 306. As discussed above, the agent may maintain an agent token or cookie identifying information about sessions (e.g., S1 and S2) created at data centers. The agent token may indicate one or more parameters of a session including a threshold session time period after which the session is no longer active unless the session is re-authenticated. In one example, an agent for client device 302 may determine that S1 is no longer active (e.g., expired) based on a cookie for S1 that indicates inactivity for S1 exceeding the session time period. However, in this example, S1 is treated as active based on session adoption of S2. USER1 is active on S2 for the threshold session time period. As further described for this example, S1 will be re-authenticated based session adoption of activity for S2 that satisfies the requirement(s) for S1. S1 will adopt the session activity of S2 in the instance where S2 is an adopted session for S1. Based on session adoption, S1 may be re-authenticated and remain active without having to request credentials from USER1 for S1.

The following operations described for diagram 400 illustrate an example of session adoption implemented to re-authenticate USER1 for S1 previously established by DC1 304. For example, S1 may be established for USER1 as described with reference to FIG. 3. At 408, an agent for client device 302 may detect that S1 has expired based on an agent token stored by the agent. In response, at 410, the agent may send a request to re-authenticate S1 for USER1. The agent sends the request to DC1 304, which handles authentication for client device 302 in this example. DC1 304 may handle authentication for client device 302 because client device 302 has a geographic affinity to DC1 304 over other data centers.

At 420, DC1 304 may assess a session (e.g., S1) for authentication or re-authentication. For example, DC1 304 may determine whether S1 is active based on session activity at DC1 304. In this example, DC1 304 determines, at 422, that S1 is not active (e.g., expired) because the session activity of USER1 at DC1 304 does not satisfy the requirement(s) for S1. In some embodiments, a requirement of session activity for a session may include satisfying a threshold time period for activity of the session. A session may not be active, or in other words expired, when USER1 is inactive on a session for the threshold time period. Authentication of USER1 may be based on the session being active, such that when the threshold time period is not satisfied, USER1 is no longer authenticated for S1. In an MDC system, S1 may not have activity once S1 is created because session activity may be spread across different data centers that control access to resources.

At 424, DC1 304 may determine whether DC1 304 supports session adoption based on one or more MDC policies. If session adoption is supported, DC1 304 may determine whether it has adopted any sessions for S1 by checking session adoption data stored at DC1 304. Session adoption data may be iterated to identify any data centers for which a session has been adopted for USER1. In this example, S2 is identified at DC2 306 for USER1. In some instances, multiple sessions may be identified, each at a different data center.

At 430, DC1 304 may request session activity data from DC2 306 for S2. DC1 304 may request session activity from those data centers which have adopted sessions. In some embodiments, requesting session activity data may include identifying, based on the session adoption data stored by DC1 304, that S2 at DC2 306 is adopted by S1. DC1 304 may send a request to DC2 306 for the session activity data of S2 for USER1. DC1 304 may request session activity data from each session identified in session adoption data indicating a session adopted for S1.

Based on the request for session activity data, at 440, DC2 306 may assess session activity for S2 to determine whether S2 is active according to session requirements. At 442, DC2 306 may send session activity data to DC1 304 for S2. The session activity data may indicate whether S2 is active and/or may indicate session activity that DC1 304 can use to determine whether S1 is active. Any other data center that receives the request from DC1 304 for session activity data may perform the operations described above at 440 for DC2 306. Other data centers requested for session activity data may send session activity for those sessions requested for session adoption.

At 460, DC1 304 can assess the session activity of adopted sessions (e.g., S2) to determine re-authentication for S1. The data received from DC2 306 may be assessed to determine whether session activity at S2 satisfies the requirement(s) for S1. For example, DC1 304 may determine whether the session activity of S2 satisfies the threshold time period for S1 based on the session requirements for S1. The session activity of S2 may be examined to determine whether there was activity on S2 at any time within a threshold time period. Similarly, DC1 304 may assess session activity received from other data centers to determine whether any adopted session satisfies the requirement(s) (e.g., threshold time period) for S1. Authentication may be provided to USER1 based on determining that the session activity for an adopted session (e.g., S2) satisfies the requirement(s) of S1.

At 462, DC1 304 may determine authentication (e.g., re-authentication for S1) based on assessing session activity of adopted sessions. DC1 304 may seamlessly provide authentication to USER1 without requesting additional credentials if S1 is active based on adopted session S2. In some embodiments, at 464, DC1 304 may send a response (e.g., an authentication response) to the agent of client 302 indicating whether S1 is re-authenticated. The agent may update the cookie for S1 to indicate that S1 is re-authenticated.

FIG. 5 illustrates a flowchart 500 a process for managing session activity of SSO access across multiple data centers according to some embodiments of the present invention. Specifically, FIG. 5 illustrates a process 500 for determining activity of a session for authentication at a data center based on session activity from an adopted session. In some embodiments, the process depicted in flowchart 500 may be implemented by DC1 120 of FIG. 1.

Flowchart 500 may begin at 502, where a first session is established for a user at a first computing system. The first computing system may be part of a first data center. For example, S1 is established for USER1 at DC1 120. The session may be established for authentication of the user.

At 504, a session adoption request is received from a second computing system. The second computing system may be part of a second data center. The second computing system may be geographically separated from the first computing system. The session adoption request is for the first computing system to adopt a second session for the first session. The second session may provide the user with access to a resource managed by the second computing system. The second session may not be established when the session adoption request is received. The session adoption request may include an identifier of the second computing system (e.g., an identifier of the second data center). In one example, DC1 120 may receive, from DC2 130, a session adoption request to adopt S2 for S1 at DC1 120. At 506, session adoption data may be stored indicating an association between the second session identified by the session data and the first session for the user. The association may be stored to indicate that the first computing has adopted the second session for the first session. The association may include an identifier of the second data center including the second computing system.

At 508, expiration of the first session is detected. Expiration of the first session may be detected based on session activity of the first session managed by the first computing system. In some embodiments, the first computing system may receive data indicating that the first session has expired. The data may be received from an agent that manages access to computing systems for the user operating a client device.

At 510, session activity data of the second session is requested from the second computing system. The session activity data may be requested based on the session adoption data, which indicates the second session as being associated with the first session. At 512, based on the session activity data for the second session, it is determined that the second session has not expired. Expiration of the second session may be based on the requirements for the first session. The second session may have activity for accessing a resource, whereas the first session may be inactive once authentication is performed. As such, at 514, upon determining that the second session has not expired, the user may be provided with seamless authentication for the first session. Since the second session is active (e.g., has not expired), the user may remained authenticated for the first session in an MDC system. Flowchart 500 may end at 516.

Figure 6:
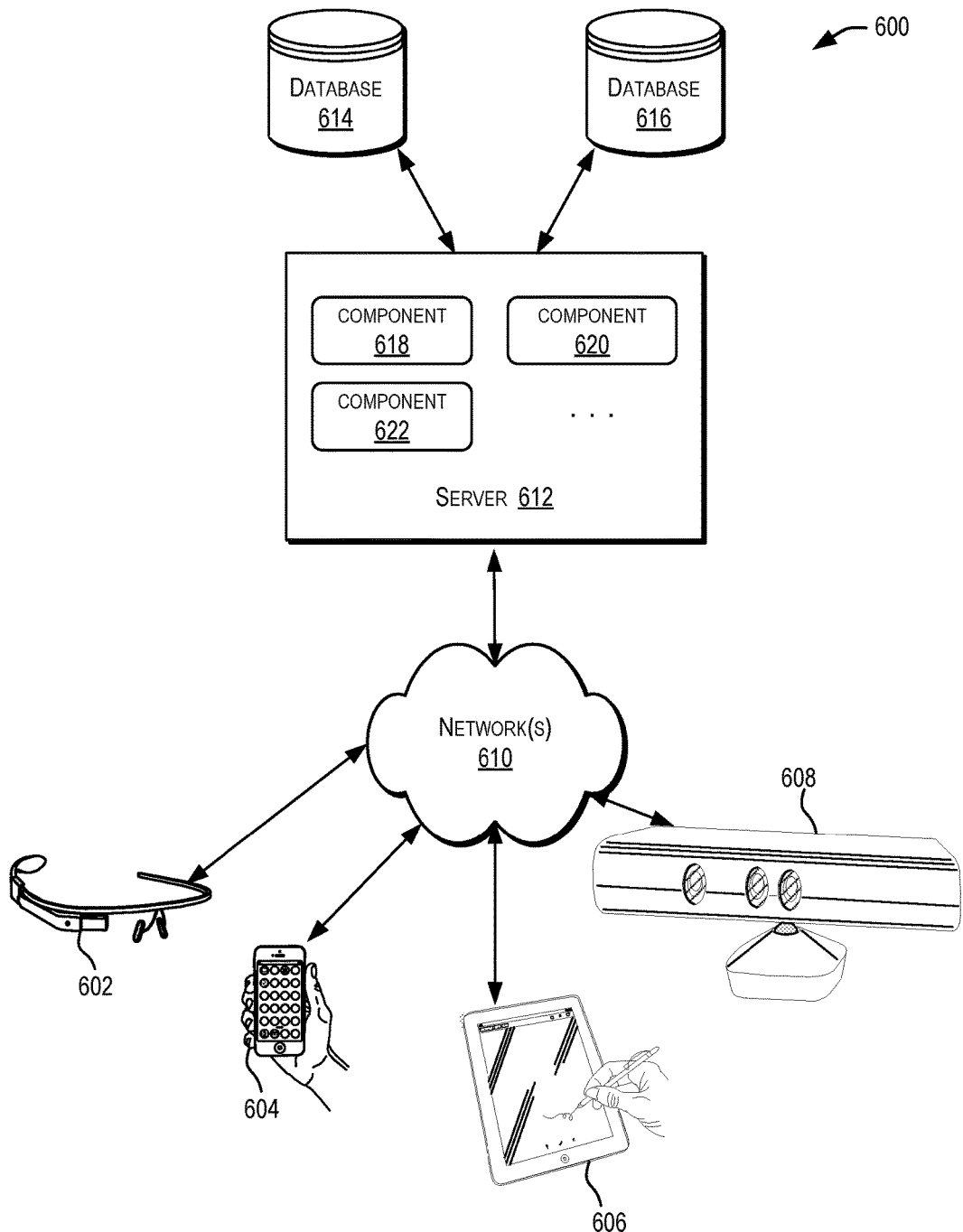
FIG. 6 depicts a simplified diagram of a distributed system for implementing an embodiment.

FIG. 6 depicts a simplified diagram of a distributed system 600 for implementing an embodiment. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications such as services and applications that may manage session activity of SSO access across multiple data centers. In certain embodiments, server 612 may also provide other services or software applications can include non-virtual and virtual environments. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

Client computing devices 602, 604, 606, and/or 608 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 610.

Although distributed system 600 in FIG. 6 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server for performing processing as described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. These databases may provide a mechanism for storing information such as user interactions information, usage patterns information, adaptation rules information, and other information used by embodiments of the present invention. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle that are adapted to store, update, and retrieve data in response to SQL-formatted commands.

Figure 7:
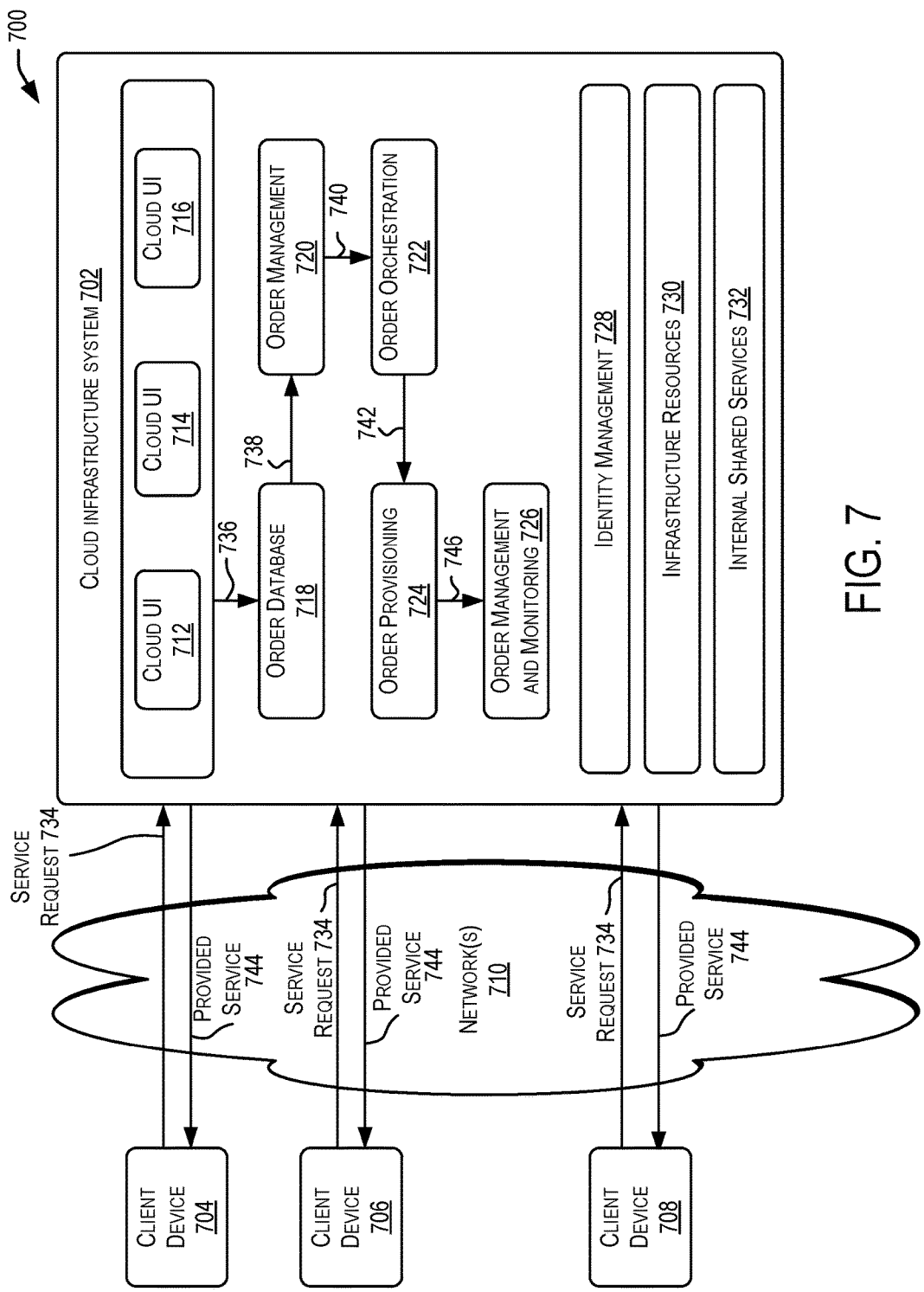
FIG. 7 illustrates a simplified block diagram of one or more components of a system environment in which services may be offered as cloud services, in accordance with an embodiment of the present disclosure.

In some embodiments, a cloud environment may provide one or more services for managing session activity of SSO access across multiple data centers. FIG. 7 is a simplified block diagram of one or more components of a system environment 700 in which services may be offered as cloud services, in accordance with an embodiment of the present disclosure. In the illustrated embodiment in FIG. 7, system environment 700 includes one or more client computing devices 704, 706, and 708 that may be used by users to interact with a cloud infrastructure system 702 that provides cloud services, including services for managing session activity of SSO access across multiple data centers. Cloud infrastructure system 702 may comprise one or more computers and/or servers that may include those described above for server 612.

It should be appreciated that cloud infrastructure system 702 depicted in FIG. 7 may have other components than those depicted. Further, the embodiment shown in FIG. 7 is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for client computing devices 602, 604, 606, and 608. Client computing devices 704, 706, and 708 may be configured to operate a client application such as a web browser, a proprietary client application (e.g., Oracle Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between client computing devices 704, 706, and 708 and cloud infrastructure system 702. Each network may be any type of network familiar to those skilled in the art that can support data communications using any of a variety of commercially-available protocols, including those described above for network(s) 610.

In certain embodiments, services provided by cloud infrastructure system 702 may include a host of services that are made available to users of the cloud infrastructure system on demand. In addition to services related to managing session activity of SSO access across multiple data centers, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provision of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at step 734, a customer using a client device, such as client computing devices 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At step 736, the order information received from the customer may be stored in an order database 718. If this is a new order, a new record may be created for the order. In one embodiment, order database 718 can be one of several databases operated by cloud infrastructure system 718 and operated in conjunction with other system elements.

At step 738, the order information may be forwarded to an order management module 720 that may be configured to perform billing and accounting functions related to the order, such as verifying the order, and upon verification, booking the order.

At step 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at step 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 722 to be isolated from implementation details, such as whether or not services and resources are actually provisioned on the fly or pre-provisioned and only allocated/assigned upon request.

At step 744, once the services and resources are provisioned, a notification may be sent to the subscribing customers indicating that the requested service is now ready for use. In some instance, information (e.g. a link) may be sent to the customer that enables the customer to start using the requested services.

At step 746, a customer's subscription order may be managed and tracked by an order management and monitoring module 726. In some instances, order management and monitoring module 726 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
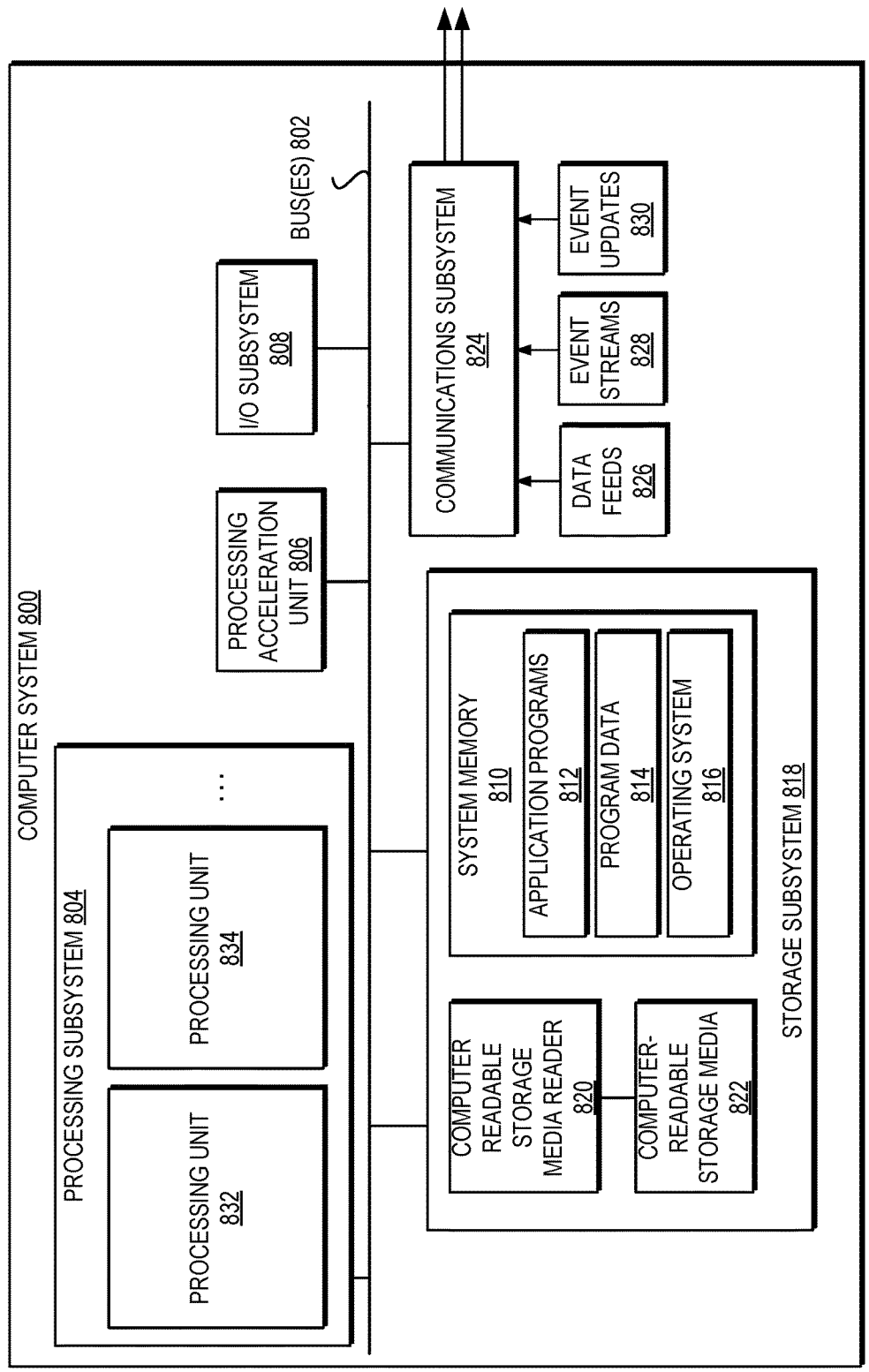
FIG. 8 illustrates an exemplary computer system that may be used to implement an embodiment of the present invention.

FIG. 8 illustrates an exemplary computer system 800 that may be used to implement an embodiment of the present invention. In some embodiments, computer system 800 may be used to implement any of the various servers and computer systems described above. As shown in FIG. 8, computer system 800 includes various subsystems including a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include be one or more processors, including single core or multicore processors, one or more cores of processors, or combinations thereof. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above for managing session activity of SSO access across multiple data centers.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with the present invention.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that when executed by processing subsystem 804 a processor provide the functionality described above may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client computing devices via the Internet for receiving and sending information from and to the client computing devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. The modifications include any relevant combination of the disclosed features. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   receiving, by a first computer system, a request to authenticate a user for a first session previously established at the first computer system, wherein the first session is inactive;
   determining, by the first computer system, based on session adoption data, that a second session hosted on a second computer system is associated with the first session;
   determining, by the first computer system, based on second session activity data of the second session obtained by the first computer system from the second computer system using the session adoption data, that the second session is active; and
   based on determining that the second session is active, authenticating, by the first computer system, the user for the first session without requesting any credentials from the user.

2. The method of claim 1, wherein the request to authenticate the user is received from a client device based on the client device detecting that the first session is inactive.

3. The method of claim 1, wherein the session adoption data is configured based on a session adoption policy that causes the first computer system to authenticate the user based on the second session activity data of the second session at the second computer system;
   wherein the session adoption policy further specifies one or more requirements for session adoption; and
   wherein the method further comprises:
      sending, by the first computer system, based on the session adoption data, a request to the second computer system for the second session activity data; and
      authenticating, by the first computer system, the user based on determining that the second session satisfies the session adoption policy.

4. The method of claim 3, further comprising:
   determining, by the first computer system and based on the session adoption policy, that the first computer system supports session adoption; and
   sending, by the first computer system and based on the determination that the first computer system supports session adoption, the request to the second computer system for the second session activity data;
   wherein the second session activity data is obtained from the second computer system based on the request for the second session activity data.

5. The method of claim 1:
   wherein the second session activity data includes a second session activity status indicating whether the second session is active.

6. The method of claim 1:
   wherein the second session activity data includes a second timestamp indicating when a second activity is last detected at the second session; and
   wherein the determination that the second session is active is based on the second timestamp.

7. The method of claim 6, wherein the second activity is associated with a duration that exceeds a threshold period according to a session requirement of the first session.

8. The method of claim 1:
   wherein the request to authenticate the user is received via a first protocol over a first network;
   wherein the second session activity data is obtained via a second protocol over a second network; and
   wherein the first protocol and the second protocol are different.

9. The method of claim 1, further comprising:
   generating, by the first computer system and from first session activity data, a cookie including a threshold session time period after which the first session becomes inactive; and
   sending, by the first computer system, the cookie to a client device,
   wherein the request to authenticate a user is sent by the client device to the first computer system based on the threshold session time period included in the cookie.

10. The method of claim 1,
    further comprising, before the first session becomes inactive:
      receiving, by the first computer system, a second request for session adoption of the first session from the second computer system; and
      sending, by the first computer system, session data of the first session to the second computer system based on the request for session adoption of the first session; and
    wherein the second session is created based on the session data of the first session.

11. The method of claim 10, wherein the session data of the first session includes an indication of a status of the first session at the first computer system.

12. The method of claim 10:
wherein the second request is sent by the second computer system based on the second computer system receiving an authorization request for a resource from the user; and
wherein the sending of the session data of the first session enables the second computer system to determine whether the user is authenticated, and to grant the user access to the resource based on the user being authenticated.

13. A system comprising:
one or more processors; and
a memory accessible to the one or more processors, the memory storing a set of instructions which, when executed by the one or more processors, causes the one or more processors to perform:
receiving a request to authenticate a user for a first session previously established at a first computer system, wherein the first session is inactive;
determining, based on session adoption data, that a second session hosted on a second computer system is associated with the first session;
determining, by the first computer system, based on second session activity data of the second session obtained by the first computer system from the second computer system using the session adoption data, that the second session is active; and
based on determining that the second session is active, authenticating, by the first computer system, the user for the first session without requesting any credentials from the user.

14. The system of claim 13, wherein the request to authenticate the user is received from a client device based on the client device detecting that the first session is inactive.

15. The system of claim 13:
wherein the request to authenticate the user is received via a first protocol over a first network;
wherein the second session activity data is obtained via a second protocol over a second network; and
wherein the first protocol and the second protocol are different.

16. A non-transitory computer-readable medium storing a set of instructions that are executable by one or more processors to cause the one or more processors to:
receive a request to authenticate a user for a first session previously established at a first computer system, wherein the first session is inactive;
determine, based on session adoption data, that a second session hosted on a second computer system is associated with the first session;
determine, based on second session activity data of the second session obtained by the first computer system from the second computer system using the session adoption data, that the second session is active; and
based on a determination that the second session is active, authenticate the user for the first session without requesting any credentials from the user.

17. The non-transitory computer-readable medium of claim 16, wherein the request to authenticate the user is received from a client device based on the client device detecting that the first session is inactive.

18. The non-transitory computer-readable medium of claim 16, wherein the session adoption data is configured based on a session adoption policy that causes the first computer system to authenticate the user based on the second session activity data of the second session at the second computer system;
wherein the session adoption policy further specifies one or more requirements for session adoption; and
wherein the set of instructions are executable by the one or more processors to further cause the one or more processors to:
based on the session adoption data, send a request to the second computer system for the second session activity data; and
authenticate the user based on determining that the second session satisfies the session adoption policy.

19. The non-transitory computer-readable medium of claim 18, wherein the set of instructions are executable by the one or more processors to further cause the one or more processors to:
determine, based on the session adoption policy, that the first computer system supports session adoption; and
based on the determination that the first computer system supports session adoption, send a second request to the second computer system for the second session activity data;
wherein the second session activity data is obtained from the second computing computer system based on the second request.

20. The non-transitory computer-readable medium of claim 16,
wherein the set of instructions are executable by the one or more processors to further cause the one or more processors to, before the first session becomes inactive:
receive a request for session adoption of the first session from the second computer system; and
send session data of the first session to the second computer system based on the request for session adoption of the first session; and
wherein the second session is created based on the session data of the first session.

* * * * *

UNITED STATES PATENT AND TRADEMARK OFFICE
CERTIFICATE OF CORRECTION

PATENT NO. : 10,572,649 B2
APPLICATION NO. : 15/707261
DATED : February 25, 2020
INVENTOR(S) : Mathew et al.

Page 1 of 2

It is certified that error appears in the above-identified patent and that said Letters Patent is hereby corrected as shown below:

On the Title Page

On page 3, Column 1, under Other Publications, Line 5, delete "-03 .ibm." and insert -- -03.ibm. --, therefor.

On page 3, Column 1, under Other Publications, Line 8, delete "theInternet:" and insert -- the Internet: --, therefor.

On page 3, Column 1, under Other Publications, Line 24, delete "/HTMUidocs/" and insert -- /HTMLdocs/ --, therefor.

On page 3, Column 1, under Other Publications, Line 28, delete "/essosuite-" and insert -- /esosuite- --, therefor.

In the Drawings

On sheet 5 of 8, in FIG. 5, under Reference Numeral 514, Line 1, delete "AUTHETICATION" and insert -- AUTHENTICATION --, therefor.

In the Specification

In Column 5, Line 51, delete "geographcially" and insert -- geographically --, therefor.

In Column 7, Line 9, delete "OAM ID" and insert -- OAM_ID --, therefor.

In Column 10, Line 64, delete "mainting" and insert -- maintaining --, therefor.

In Column 14, Line 37, delete "s" and insert -- is --, therefor.

Signed and Sealed this
Twenty-seventh Day of October, 2020

Andrei Iancu
*Director of the United States Patent and Trademark Office*

CERTIFICATE OF CORRECTION (continued)
U.S. Pat. No. 10,572,649 B2

In the Claims

In Column 30, Lines 13-14, In Claim 3, delete "satistifies" and insert -- satisfies --, therefor.